(12) United States Patent
Yamasaki

(10) Patent No.: US 7,216,561 B2
(45) Date of Patent: May 15, 2007

(54) TILT ADJUSTING TYPE STEERING APPARATUS FOR VEHICLE

(75) Inventor: Daijiro Yamasaki, Gunma-ken (JP)

(73) Assignee: NSK Ltd., Tokyo (JP)

( * ) Notice: Subject to any disclaimer, the term of this patent is extended or adjusted under 35 U.S.C. 154(b) by 381 days.

(21) Appl. No.: 10/615,189

(22) Filed: Jul. 9, 2003

(65) Prior Publication Data
US 2004/0007863 A1    Jan. 15, 2004

(30) Foreign Application Priority Data

Jul. 11, 2002   (JP)   ............... 2002-202905
Mar. 13, 2003   (JP)   ............... 2003-068429

(51) Int. Cl.
    *B62D 1/18*    (2006.01)
(52) U.S. Cl. .................. 74/493; 280/775
(58) Field of Classification Search ............ 74/493; 280/775
    See application file for complete search history.

(56) References Cited

U.S. PATENT DOCUMENTS

| | | | | |
|---|---|---|---|---|
| 4,538,477 A * | 9/1985 | Kurusu et al. | ............. | 74/493 |
| 4,593,577 A * | 6/1986 | Kinoshita | ............. | 74/493 |
| 5,143,402 A * | 9/1992 | Higashino et al. | ......... | 280/775 |
| 5,452,624 A * | 9/1995 | Thomas et al. | ............. | 74/493 |
| 5,503,431 A * | 4/1996 | Yamamoto | ............. | 280/777 |
| 6,282,977 B1 * | 9/2001 | Satoh et al. | ............. | 74/493 |
| 6,591,709 B1 * | 7/2003 | Kim et al. | ............. | 74/493 |
| 2002/0020244 A1 * | 2/2002 | Janeczko et al. | ............. | 74/493 |
| 2004/0237695 A1 * | 12/2004 | Sato | ............. | 74/493 |

FOREIGN PATENT DOCUMENTS

| | | |
|---|---|---|
| JP | 11-198821 | 7/1999 |
| JP | 2000-289627 | 10/2000 |

* cited by examiner

*Primary Examiner*—Richard Ridley
*Assistant Examiner*—Justin Krause
(74) *Attorney, Agent, or Firm*—Miles & Stockbridge P.C.

(57) ABSTRACT

A tilt adjusting type steering apparatus for a vehicle, comprises a front column member fixed to a car body, a rear column member connected in a swayable manner to said front column member, a fixed gear formed on one of the front column member and the rear column member, a movable gear formed on the other of the front column member and the rear column member, a gear pressing lever swayed to effect fastening at a tilt adjusted position by making the movable gear mesh with the fixed gear or to effect releasing from the tilt adjusting position by disengaging the two gears from each other, and an operator lever for interlocking with and swaying the gear pressing lever while being swayed by an operation of an operator.

39 Claims, 14 Drawing Sheets

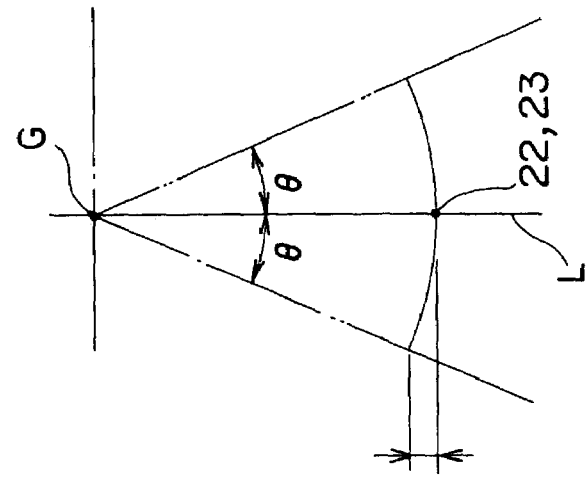
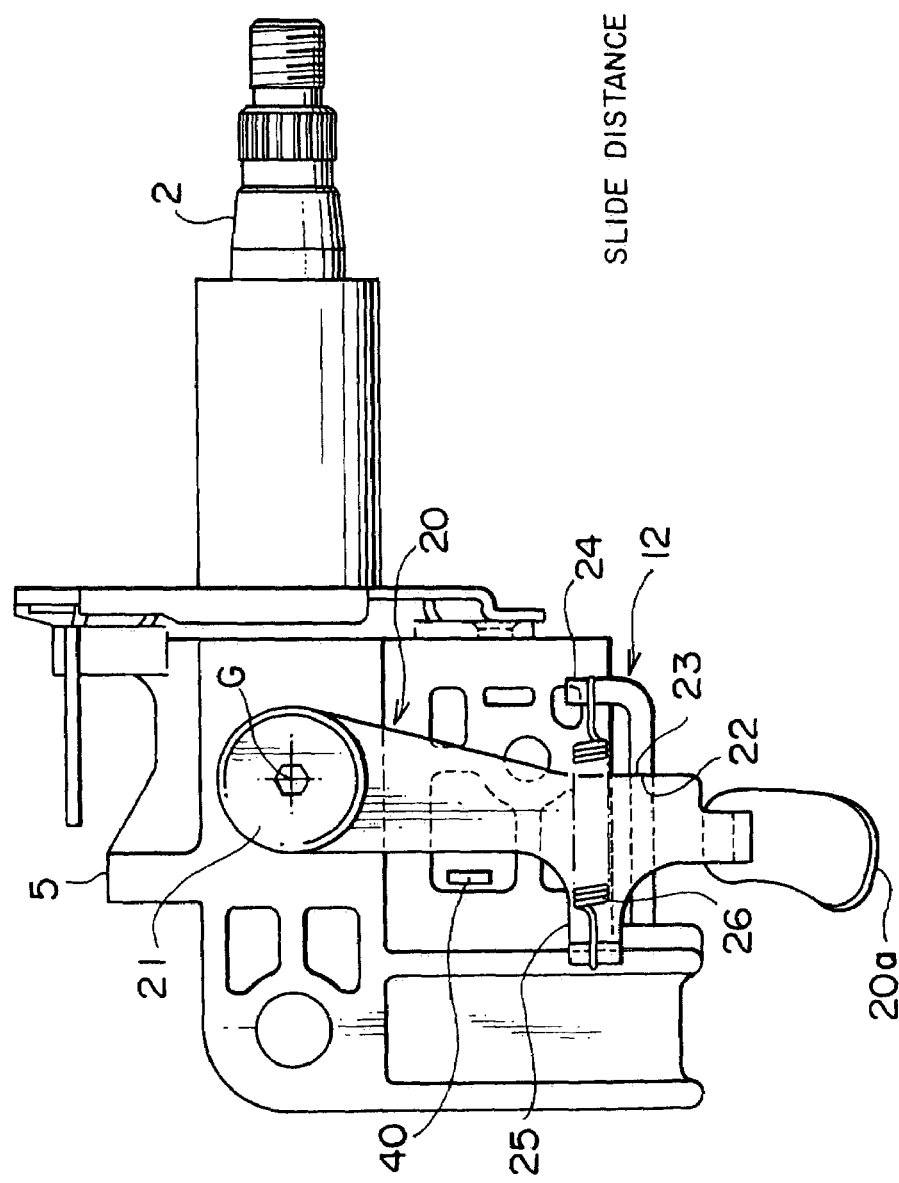

TILT ADJUSTING TYPE STEERING APPARATUS FOR VEHICLE

This application claims the benefit of Japanese Patent Applications No. 2002-202905 and 2003-068429 which are hereby incorporated by reference.

BACKGROUND OF THE INVENTION

1. Field of the Invention

The present invention relates to a tilt adjustable type steering apparatus for a vehicle, which prevents a release of tilt adjusted position fastening at a secondary collision.

2. Related Background Art

A tilt adjustable type steering apparatus capable of adjusting a tilt angle of a steering wheel, corresponding to a physique, a driving posture, etc. of a driver is, as disclosed in, e.g., Japanese Patent Application Laid-Open No.11-198821, constructed such that a rear column member is so connected in a swayable or rockable manner to a rear side end of a front column member fixed to a car body (which is a so-called swing tilt).

FIGS. 12 through 14 illustrate the tilt type steering apparatus disclosed in Japanese Patent Application Laid-Open No.11-198821 given above. FIG. 12 is a rear view (showing the front as viewed from the rear of the vehicle, wherein a partial sectional view therein shows a section taken along the line A—A in FIG. 13) of the tilt type steering apparatus for the vehicle in the prior art. FIG. 13 is a vertical sectional view of the tilt type steering apparatus for the vehicle in the prior art. FIG. 14 is a bottom view of the tilt type steering apparatus for the vehicle in the prior art.

A steering shaft is divided into a front steering shaft 1 and a rear steering shaft 2, which are connected by a universal joint 3. The front steering shaft 1 and the rear steering shaft 2 are rotatably accommodated in a front column member 4 and a rear column member 5, respectively.

The rear column member 5 is connected in the swayable manner to a rear portion of the front column member 4 fixed to the car body. The rear column member 5 is so structured as to be swayable or rockable within a tilt adjustable range about a tilt center C. Note that the tilt center C is concentric with the universal joint 3.

A fixed gear 6 having a gear teeth portion 6a is fixed to an undersurface of the front column member 4. A movable gear 8 having a gear teeth portion 8a meshing with the gear teeth portion 6a of the fixed gear 6 is pivotally supported in the swayable or rockable manner around on a pivot 7 provided in the rear column member 5. Note that the respective gear teeth portions 6a, 8a are arranged circularly around the tilt center C.

A reaction member 9 is extended in a car-width direction below the movable gear 8. A wedge-shaped member 10 having a tapered surface 10a for pressing a rear tapered surface of the movable gear 8 in a way that abuts and slides on this rear tapered surface, is so disposed as to be movable in back-and-forth directions between the movable gear 8 and the reaction member 9.

A compression coil spring (a length-expansion coil spring) 11 is disposed between a rear side end of the wedge-shaped member 10 and an extended piece 8b extending from the movable gear 8. The compression coil spring (the length-expansion coil spring) 11 gives a bias to the gear teeth portion 8a of the movable gear 8 through the wedge-shaped member 10 at all times in such a direction that the gear teeth portion 8a of the movable gear 8 and the gear teeth portion 6a of the fixed gear 6 mesh with each other. The compression coil spring (the length-expansion coil spring) 11 has, however, a function of biasing the movable gear 8 through the extended piece 8b in a releasing direction when in tilt releasing.

A tilt lever 12 is formed integrally on both sides of the rear portion of the wedge-shaped member 10 and extends in the car-widthwise direction. The tilt lever 12 is swayable about a lever rotation center pin 12a provided on the rear column member 5.

Note that a support spring (a length-expansion coil spring) 13 is disposed between the front column member 4 and the rear column member 5. This configuration prevents descents of the rear column member 5, the steering wheel, etc. when the two gears 6, 8 disengage from each other.

Further, the fixed gear 6 is fixed to the front column member 4 by bolts 14, 15, whereby the gear meshing can be adjusted.

In a tilt lock mechanism constructed described above, when making a tilt adjustment, the tilt lever 12 is swayed or moved backwards of the vehicle, against the biasing force of the compression spring (the length-expansion coil spring) 11, thereby retreating the wedge-shaped member 10 backwards.

As a result, the movable gear 8 which is assisted by the biasing force of the compression spring (the length-expansion coil spring) 11 is thereby rotated and thus disengages from the fixed gear 6. With this arrangement, the tilt releasing can be attained.

The tilt adjustment is effected in a way that tilts the rear column member 5 within the tilt adjustable range adapted to driving of the vehicle.

After making the tilt adjustment, upon a release from the tilt lever 12, the tilt lever 12 is swayed forwards of the vehicle by the biasing force of the compression spring (the length-expansion coil spring) 11, thereby moving the wedge-shaped member 10 forwards.

As a result, the gear teeth portion 8a of the movable gear 8 is pressed against and firmly meshed with the gear teeth portion 6a of the fixed gear 6 by dint of the wedge-shaped member 10 biased by the compression spring (the length-expansion coil spring) 11. This enables tilt fastening.

Incidentally, according to the tilt lock mechanism described above, the tilt lever 12 which is formed integrally on both sides of the rear portion of the wedge-shaped member 10, extends in the car-widthwise direction and is swayable substantially in the horizontal direction about the lever rotation center pin 12a provided perpendicularly to the rear column member 5.

In particular, as shown in FIGS. 12 and 14, a handle portion 12b, for an operator, of the tilt lever 12 is comparatively largely protrudes sideways of the two column members 4, 5. The tilt fastening/releasing operations are done by swaying this handle portion 12b substantially in the horizontal direction.

As a result, when the rear column member 5, etc. gets collapsed and this moves forwards of the vehicle upon a secondary collision of the vehicle, an instrument panel impinges on the handle portion 12b of the tilt lever 12 that protrudes sideways, and the tilt releasing might occur.

SUMMARY OF THE INVENTION

It is a primary object of the present invention, which was devised under such circumstances, to provide a tilt adjusting type steering apparatus for a vehicle that is capable of preventing releasing from a tilt adjusted position upon a secondary collision.

To accomplish the above object, a tilt adjusting type steering apparatus for a vehicle includes a front column member fixed to a car body, a rear column member connected in a swayable manner to the front column member, a fixed gear formed on one of the front column member and the rear column member, a movable gear formed on the other of the front column member and the rear column member, a gear pressing lever swayed to effect fastening at a tilt adjusted position by making the movable gear mesh with the fixed gear or to effect releasing from the tilt adjusted position by disengaging the two gears from each other, and an operator lever for interlocking with and swaying the gear pressing lever while being swayed by an operation of an operator.

Thus, according to the present invention, since the operator lever for swaying the gear pressing lever is provided, the operator lever can be positioned without any restraint by the gear pressing lever.

In the tilt type steering apparatus for the vehicle according to the present invention, a handle portion, for the operator, of the operator lever is disposed below the column member. According to this configuration, the handle portion, for the operator, of the operator lever is disposed below the column member, and hence the handle portion of the tilt lever has no portion protruded sideways, whereby the releasing from the tilt adjusted position upon the secondary collision can be prevented.

Moreover, the gear pressing lever has the same structure as a conventional tilt adjusting lever has, and a conventional tilt lock mechanism can be used as it is.

In the tilt adjusting type steering apparatus for the vehicle according to the present invention, a buffer member is interposed between slide-abutting surfaces, abutting on and sliding on each other, of the gear pressing lever and of the operator lever. Thus, the buffer member is interposed between the slide-abutting surfaces, abutting on and sliding on each other, of the gear pressing lever and of the operator lever, and it is therefore feasible to prevent a contact noise and a slide noise from causing between the two levers and to improve a lever operation feeling.

In the tilt adjusting type steering apparatus for the vehicle according to the present invention, the handle portion of the operator lever is preferably disposed farther away from the center of the sway of the operator lever than the slide-abutting surface. Thus, since the handle portion of the operator lever is preferably disposed farther away from the center of the sway of the operator lever than the slide-abutting surface, an operation force of the operator lever can be reduced based on the principle of leverage.

In the tilt adjusting type steering apparatus for the vehicle according to the present invention, the operator lever is preferably molded of a non-ferrous metal or a synthetic resin. Thus, the operator lever is preferably molded of the non-ferrous metal or the synthetic resin, whereby a weight of the operator lever can be reduced, and the moldability can be improved.

BRIEF DESCRIPTION OF THE DRAWINGS

FIG. 4A is an enlarged side view of a rear column member of the tilt adjusting type steering apparatus for the vehicle shown in FIG. 1; FIG. 4B is a schematic diagram showing a swayable range of a gear pressing lever and an operator lever;

DETAILED DESCRIPTION OF THE PREFERRED EMBODIMENTS

A tilt adjusting type steering apparatus for a vehicle in embodiments of the present invention will hereinafter be described with reference to the accompanying drawings.

(First Embodiment)

Figure 1:
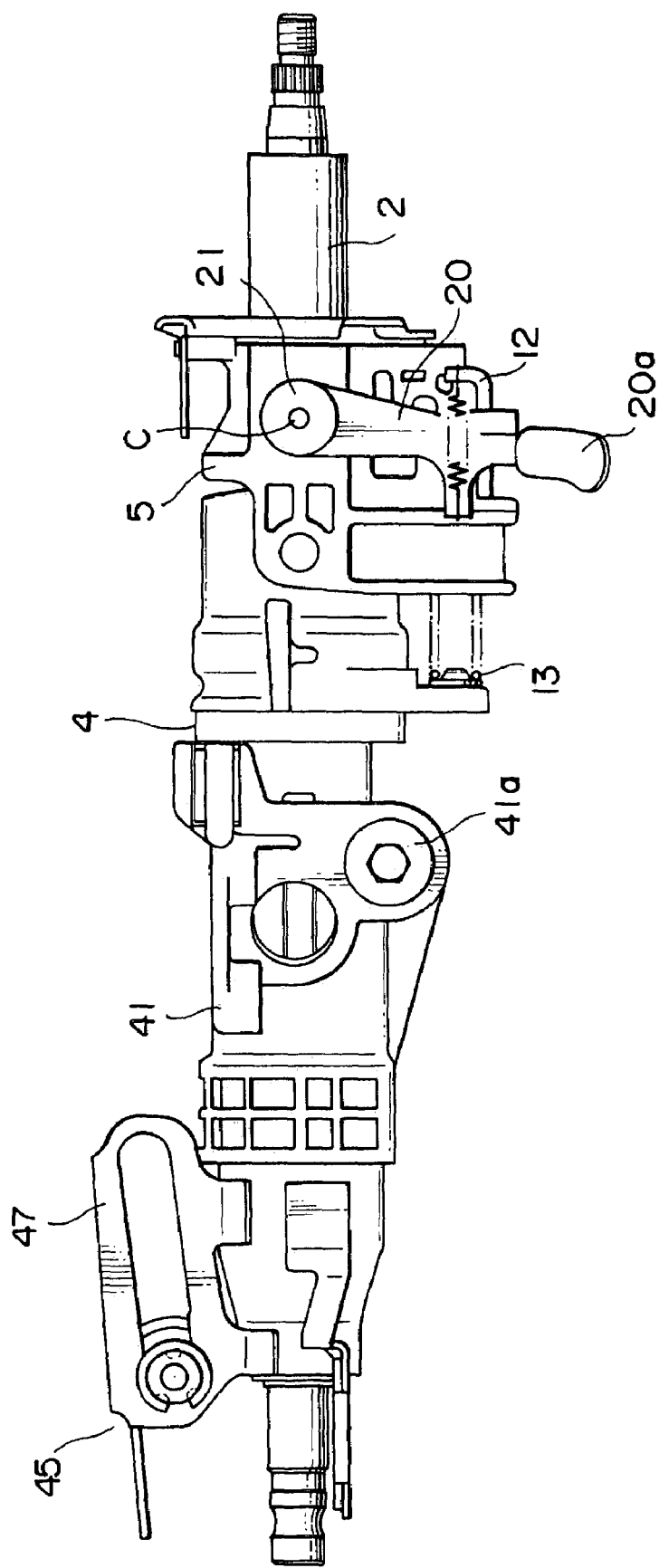
FIG. 1 is a side view of a tilt adjusting type steering apparatus for a vehicle in a first embodiment of the present invention.
Figure 2:
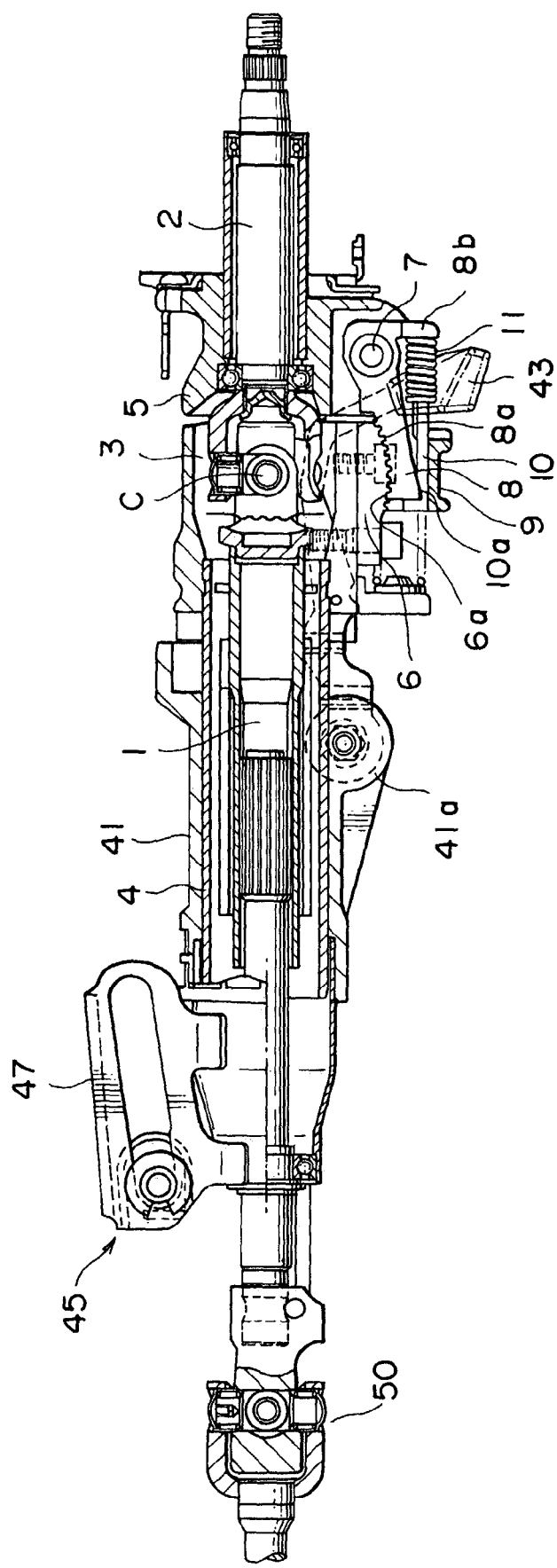
FIG. 2 is a sectional view in a central longitudinal direction of the tilt adjusting type steering apparatus for the vehicle shown in FIG. 1.
Figure 3:
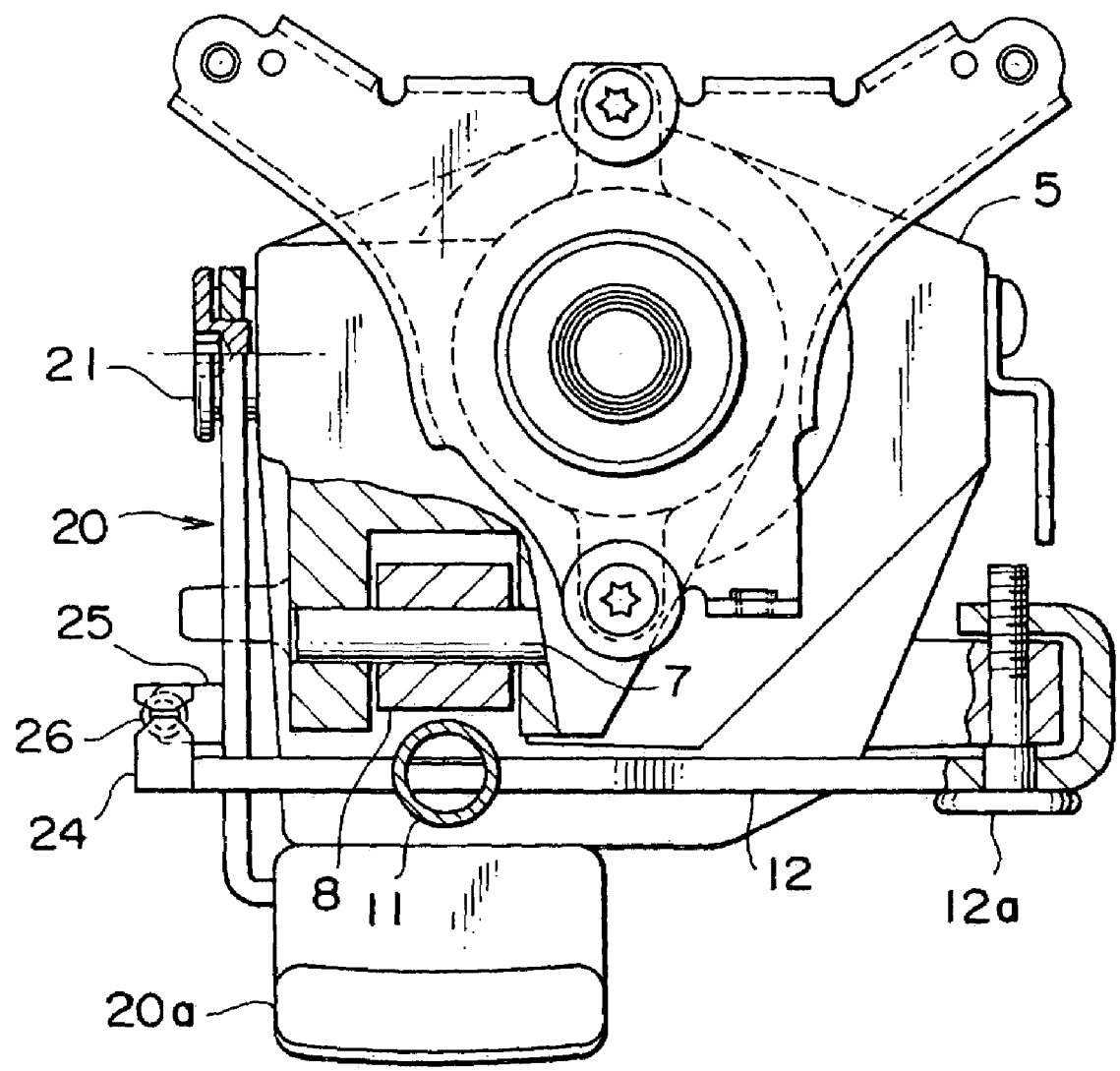
FIG. 3 is an enlarged rear view (showing the front as viewed from the rear of the vehicle) of the tilt adjusting type steering apparatus for the vehicle shown in FIG. 1.
Figure 5:
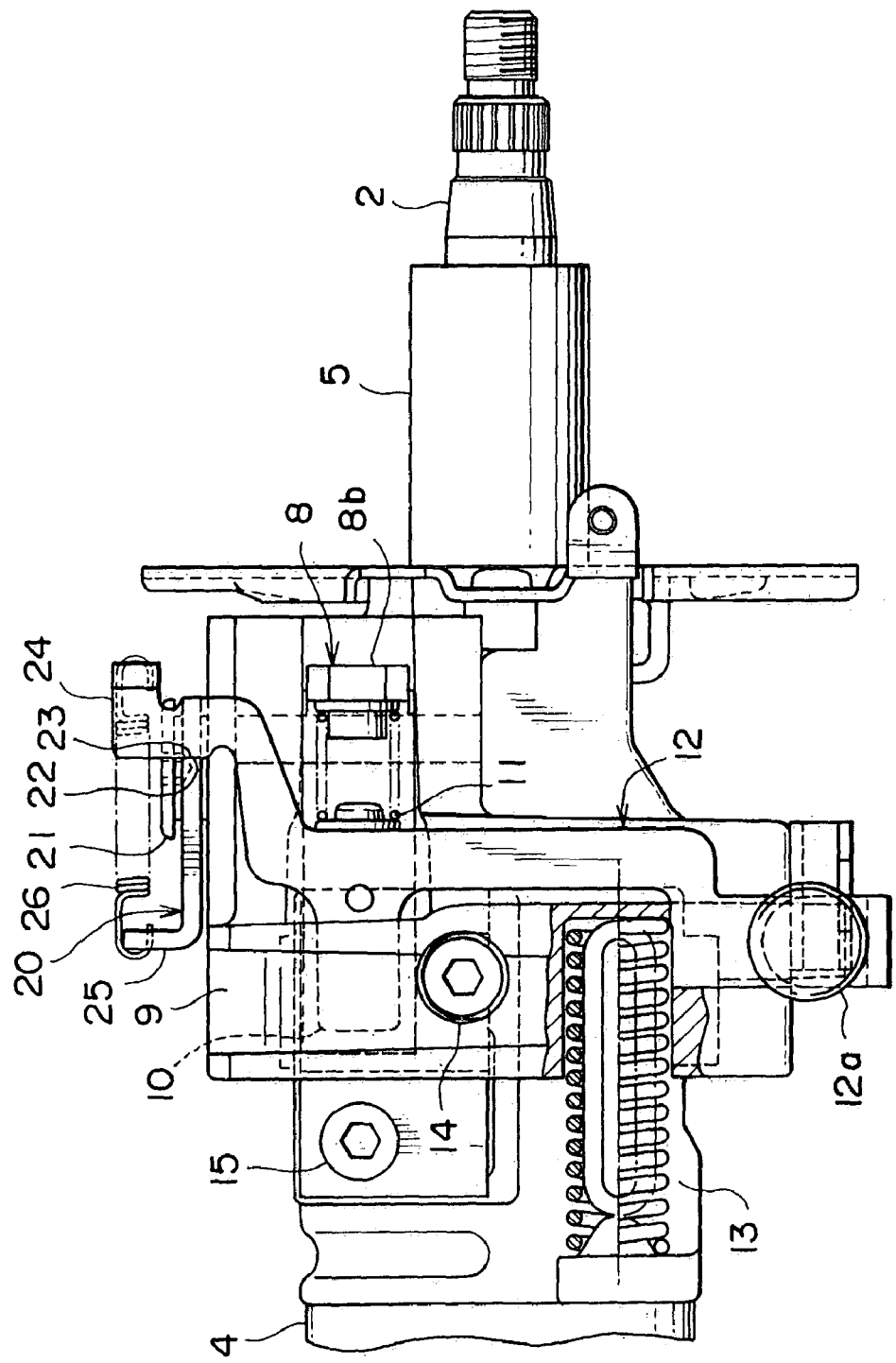
FIG. 5 is a bottom view of the tilt adjusting type steering apparatus for the vehicle shown in FIG. 3.
Figure 12:
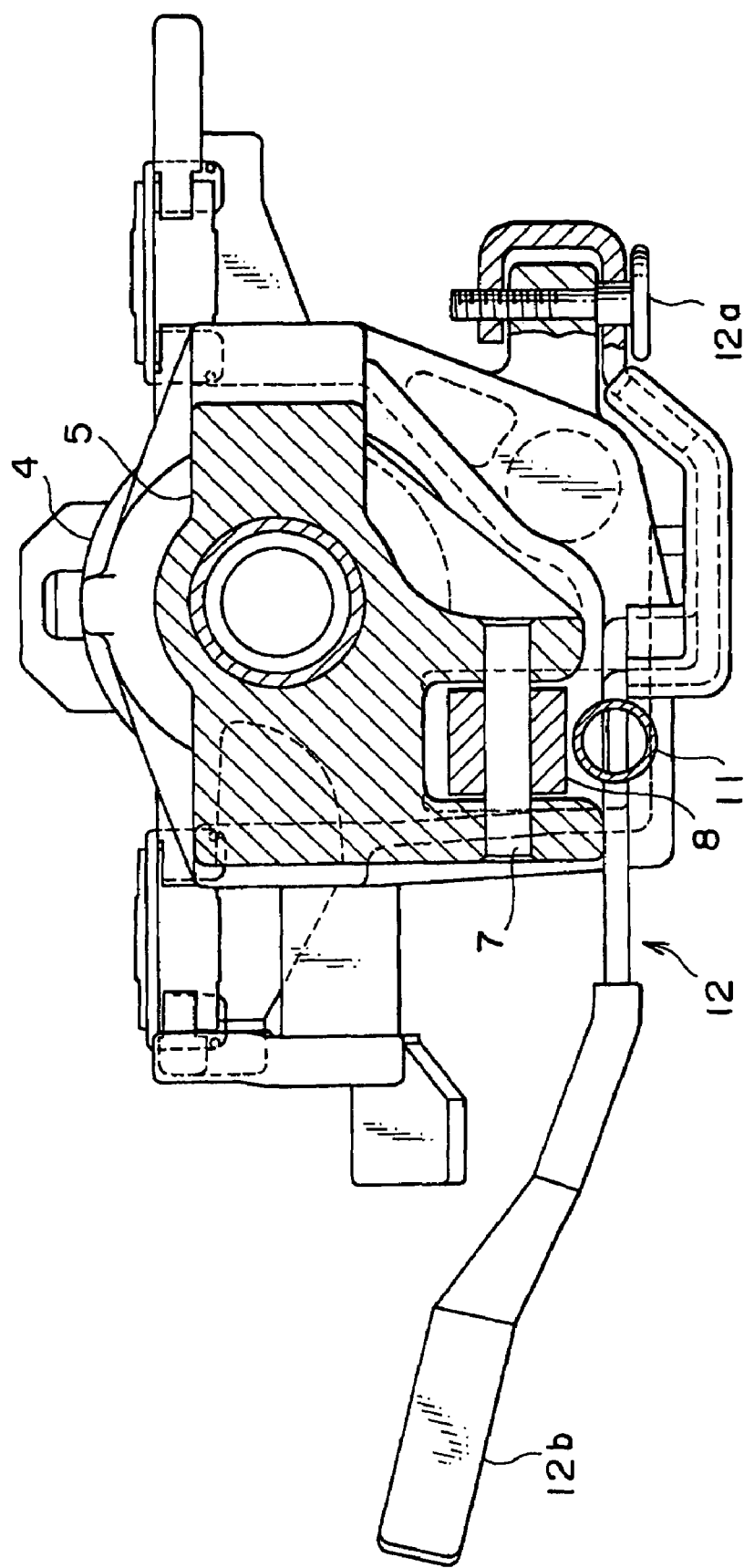
FIG. 12 is a rear view (showing the front as viewed from the rear of the vehicle, wherein a partial sectional view therein shows a section taken along the line A—A in FIG. 13) of a tilt adjusting type steering apparatus for a vehicle in the prior art.
Figure 13:
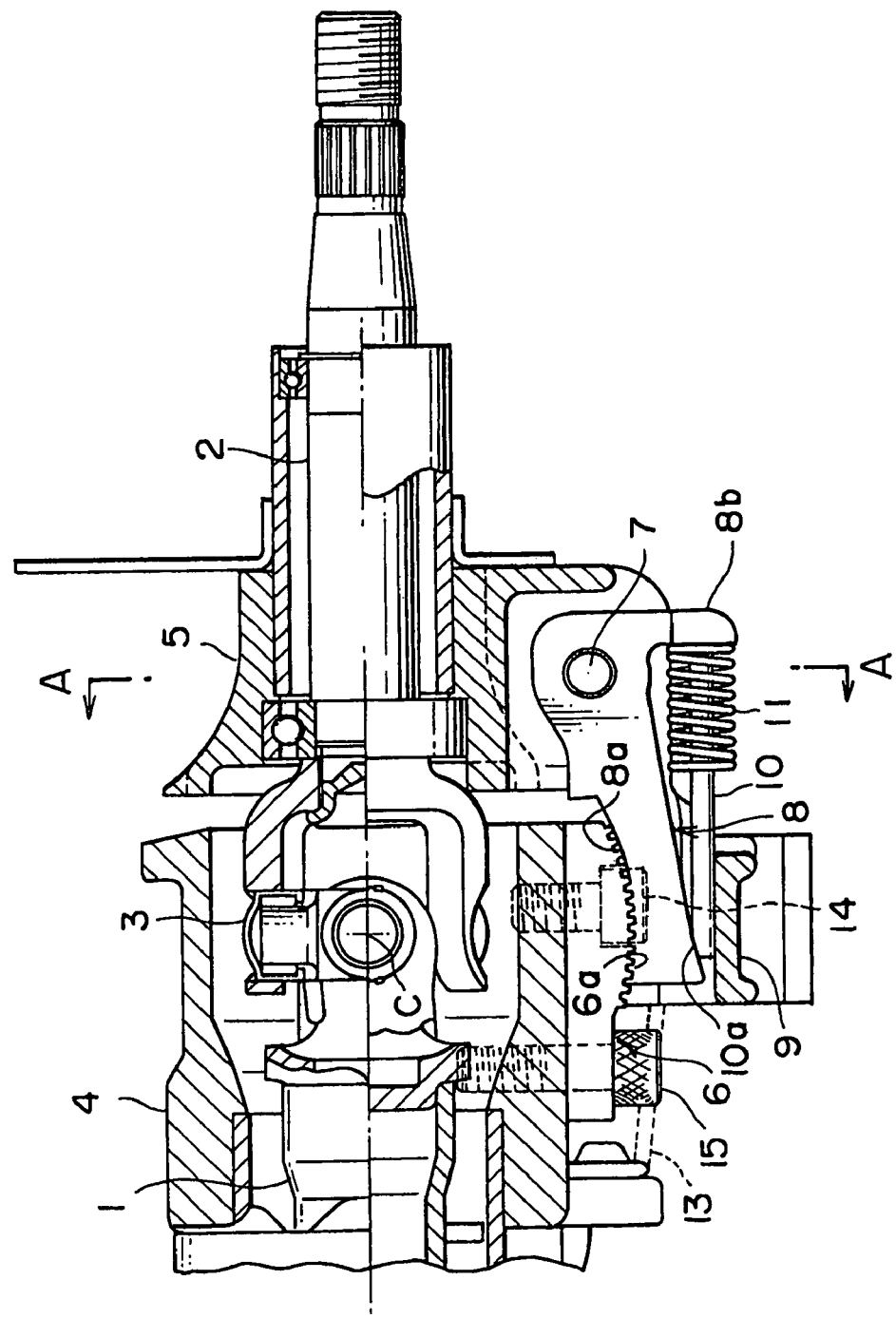
FIG. 13 is a vertical sectional view of the tilt adjusting type steering apparatus for the vehicle in the prior art.
Figure 14:
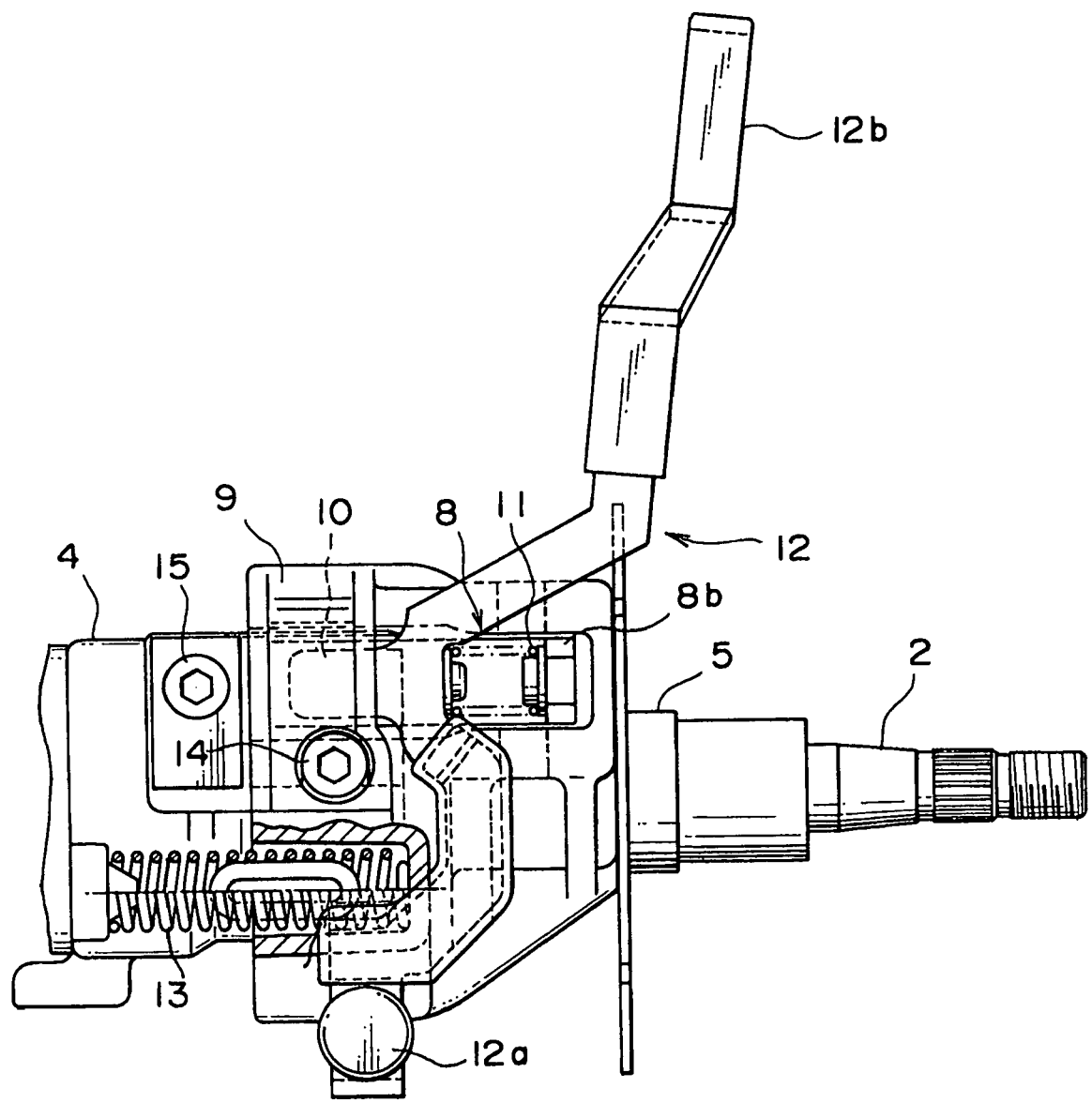
FIG. 14 is a bottom view of the tilt adjusting type steering apparatus for the vehicle in the prior art.

FIG. 1 is a side view showing substantially the whole of the tilt adjusting type steering apparatus for the vehicle in a first embodiment of the present invention. FIG. 2 is a sectional view taken in a central longitudinal direction thereof. FIG. 3 is a rear view (showing the front as viewed from the rear of the vehicle). FIG. 4A is a side view showing a rear column member of the tilt adjusting type steering apparatus for the vehicle shown in FIG. 3. FIG. 4B is a schematic diagram showing a swayable range of a gear pressing lever and an operator lever. FIG. 5 is a bottom view of the tilt adjusting type steering apparatus for the vehicle shown in FIG. 3. Basic components are substantially the same as those illustrated in FIGS. 12 through 14. The same components as those in FIGS. 12 through 14 are marked with the same figures and symbols.

A steering shaft is divided into a front steering shaft 1 and a rear steering shaft 2, which are connected by a universal joint 3. The front steering shaft 1 and the rear steering shaft 2 are rotatably accommodated in a front column member 4 and a rear column member 5, respectively.

In the first embodiment, the front column member 4 is held by a column fastening mechanism 41. The column fastening mechanism 41 is capable of adjusting a fastening state through a clamp portion 41a provided below of the column and adjusting a telescopic position of the steering column by unfastening. A telescopic position adjustment lever 43 is provided for this adjustment, extending from the clamp portion 41a towards the rear of the vehicle.

A bracket 45 for fixing the front column member 41 to the car body is provided with an impact energy absorption mechanism 47.

A front side end portion of the front steering shaft 1 is connected to an unillustrated gear box via an intermediate shaft coupling including a universal joint 50.

The column fastening mechanism 41, the impact energy absorption mechanism and the universal joint 50 are not directly related with the present invention, and hence their detailed explanations are omitted.

On the other hand, a rear column member 5 is connected in a swayable manner to the rear portion of the front column member 4 fixed to the car body, and is swayable about a tilt center C within a tilt adjustable range. Note that the tilt center C is concentric with the universal joint 3.

A fixed gear 6 having a gear teeth portion 6a is fixed to an undersurface of the front column member 4. A movable gear 8 having a gear teeth portion 8a meshing with the gear teeth portion 6a of the fixed gear 6 is pivotally supported in the swayable manner around on a pivot 7 provided in the rear column member 5. Note that the respective gear teeth portions 6a, 8a are arranged circularly around the tilt center C.

A reaction member 9 is extended in a car-widthwise direction below the movable gear 8. A wedge-shaped member 10 having a tapered surface 10a for pressing a rear tapered surface of the movable gear 8 in a way that abuts and slides on this rear tapered surface, is so disposed as to be movable in back-and-forth directions between the movable gear 8 and the reaction member 9.

A compression coil spring (a length-expansion coil spring) 11 is disposed between a rear side end of the wedge-shaped member 10 and an extended piece 8b extending from the movable gear 8. The compression spring (the length-expansion coil spring) 11 gives such a bias that the wedge-shaped member and the extended piece 8b move away from each other, and gives the bias to the gear teeth portion 8a of the movable gear 8 at all times in such a direction that the gear teeth portion 8a of the movable gear 8 and the gear teeth portion 6a of the fixed gear 6 mesh with each other. The compression spring (the length-expansion coil spring) 11 has, however, a function of biasing the movable gear 8 through the extended piece 8b in a releasing direction also when releasing the tilt position fastening.

As shown in FIG. 5, a support spring (a length-expansion coil spring) 13 is disposed between the front column member 4 and the rear column member 5. This configuration prevents descents of the rear column member 5, the steering wheel, etc. when the two gears 6, 8 disengage from each other.

Further, the fixed gear 6 is fixed to the front column member 4 by bolts 14, 15, whereby the gear meshing can be adjusted.

According to the first embodiment, a gear pressing lever 12 is formed integrally at the rear portion of the wedge-shaped member 10 and extends in a car-widthwise direction below the rear column member 5. The gear pressing lever 12 is swayable about a lever rotation center pin 12a, substantially in the horizontal direction, provided perpendicularly to the rear column member 5.

There is provided an operator lever 20 that interlocks with and thus makes the gear pressing lever 12 sway, as by a link mechanism, while being swayed by an operation of the operator.

A proximal side end portion of this operator lever 20 is fitted pivotably or in a swayable manner to a side surface of the rear column member 5 about a fitting pin 21. A middle portion of this lever 20 has a slide-abutting surface 23 (which will hereinafter simply be termed the slide surface 23) that abuts and slides on a slide-abutting surface 22 (which will hereinafter simply be termed the slide surface 22), extending in the car-widthwise direction, of the gear pressing lever 12. A front side end portion of the lever 20 is bent as a handle portion 20a and thereafter extended up to the lower part of the rear column member 5. A position of the handle portion 20a is not limited to an illustrated position and can be properly selected.

According to the first embodiment, the gear pressing lever 12 abuts on and slides on the rear end surface of the operator lever 20, however, it may be configured so that the gear pressing lever 12 abuts and slides on the front end surface of the operator lever 20.

A tension coil spring (a contraction coil spring) 26 for elastically biasing the two levers 12, 20 in such directions as to get close to each other and abut on each other, is provided between a hook portion 24 of the gear pressing lever 12 and a hook portion 25 of the operator lever 20.

In this configuration, the operator lever 20, when swayed in the back-and-forth directions of the vehicle, with the slide surfaces 22, 23 abutting and sliding on each other, interlocks with and sways the gear pressing lever 12 in the back-and-forth direction of the vehicle. Note that the slide surfaces 22, 23 gain a smooth slide when in operation by coining or increasing surface roughness.

Incidentally, as described above, the two levers 12, 20 are always abutted on each other by the tension coil spring (the contraction coil spring) 26 in order to restrain a strike sound between the two levers 12, 20 due to vibrations, etc. There can be, however, considered a method in which a coil spring or a tension spring is disposed between the gear pressing lever 12 and the rear column member 5, and the gear pressing lever 12 is thus pushed against the operator lever 20 at all times, and a method in which the coil spring or the tension spring is disposed between the operator lever 20 and the rear column member 5, and the operator lever 20 is thus pushed against the gear pressing lever 12 at all times. According to the former method, however, the spring action works always in the tilt releasing direction, which is undesirable. Further, in the case of the latter method, the spring action works always in the tilt fastening direction, however, an operating force of the operator lever 20 rises on the occasion of attaining the tilt releasing by operating the operator lever 20, which is also undesirable. Such being the case, according to the first embodiment, the tension spring (the contraction coil spring) 26 keeps the two levers 12, 20 abutting on each other at all times so as not to have any influence on the tilt lock mechanism.

In the thus constructed tilt lock mechanism, when the handle portion 20a of the operator lever 20 is pulled backwards of the vehicle on the occasion of making the tilt adjustment, the operator lever 20 pushes and sways the gear pressing lever 12 backwards of the vehicle while the slide surface 23 of the lever 20 abuts and slides on the slide surface 22 of the gear pressing lever 12.

With this contrivance, the gear pressing lever 12 is swayed backwards of the vehicle, against the biasing force of the compression spring (the length-expansion coil spring) 11, thereby retreating the wedge-shaped member 10 back.

As a result, the movable gear 8 is rotated with the assistance of the biasing force of the compression spring (the length-expansion coil spring) 11 and disengages from the fixed gear 6, whereby the tilt releasing can be attained.

The tilt adjustment is effected in such a way that the rear column member 5 is tilted within the tilt adjustable range adapted to the driving of the vehicle.

Incidentally, it might be considered that the operator presses the operator lever more forwards than needed after a completion of fastening to the tilt position. According to the first embodiment, a protrusion 40 is provided integrally on the rear column member 5 and serves as a stopper against the operator lever 20.

After making the tilt adjustment, when the operator releases the hand from the handle portion 20a of the operator lever 20 or presses the handle portion 20a forwards of the vehicle, the gear pressing lever 12 is swayed forwards of the vehicle by the biasing force of the compression spring (the length-expansion coil spring) 11, thereby moving the wedge-shaped member 10 forwards.

As a result, the gear teeth portion 8a of the movable gear 8 is, by dint of the wedge-shaped member 10 biased by the compression spring (the length-expansion coil spring) 11, pressed against the gear teeth portion 6a of the fixed gear 6 and thus firmly meshes therewith, whereby the tilt fastening can be attained.

Thus, according to the first embodiment, there is provided the operator lever 20 that interlocks with and sways the gear pressing lever 12 while being swayed by the operation of the operator. The handle portion 20a, for the operator, of the operator lever 20 is disposed below the rear column member 5, and therefore the handle portion of the tilt lever comes to have no portion protruded sideways, whereby the tilt releasing upon a secondary collision can be prevented.

The first embodiment has, with the gear pressing lever 12 and the operator lever 20 excluded, the same structure as the conventional tilt lever has, and the conventional tilt lock mechanism can be used as it is.

Further, it is preferable that the handle portion 20a of the operator lever 20 be disposed farther from a sway center G (a center of the fitting pint 21) of the operator lever 20 than the slide surfaces 22, 23. In this case, based on the principle of leverage, the operation force of the operator lever 20 can be reduced.

Further, it is preferable that the operator lever 20 be molded of a non-ferrous metal or a synthetic resin. In this case, a weight of the operator lever 20 can be decreased, a moldability can be improved, and a disagreeable sound (noise) caused between the slide surfaces 22, 23 can be prevented.

Moreover, as shown in FIG. 4A, in the case of the link mechanism in accordance with the first embodiment, the slide surfaces 22, 23 of the gear pressing lever 12 and of the operator lever 20 slide on each other, and there might be a possibility in which a slide noise is emitted, and an operation feeling when operating the lever is affected. It is therefore desirable that a slide distance (length) between the slide surfaces 22, 23 when operating the lever be decreased to the greatest possible degree.

Accordingly, as illustrated in FIG. 4B, let (L) be an imaginary line perpendicular to a kinetic direction of the gear pressing lever 12 as viewed from the side surface and passing through the sway center G (the center of the fitting pin 21) of the operator lever 20 as shown in FIG. 4A, and, if swayed through an equal angle (θ) about this imaginary line (L), the slide distance (length) between the slide surfaces 22, 23 can be minimized.

Note that if a sway position of the gear pressing lever 12 is similarly set, the lever slide distance (length) can be minimized.

Further, if the slide distance (length) is thus minimized, as in second and fourth embodiments that will be discussed later on, if buffer members (30, 33) are provided on the slide surfaces 22, 23, materials of the buffer members (30, 33) can be reduced.

(Second Embodiment)

Figure 6:
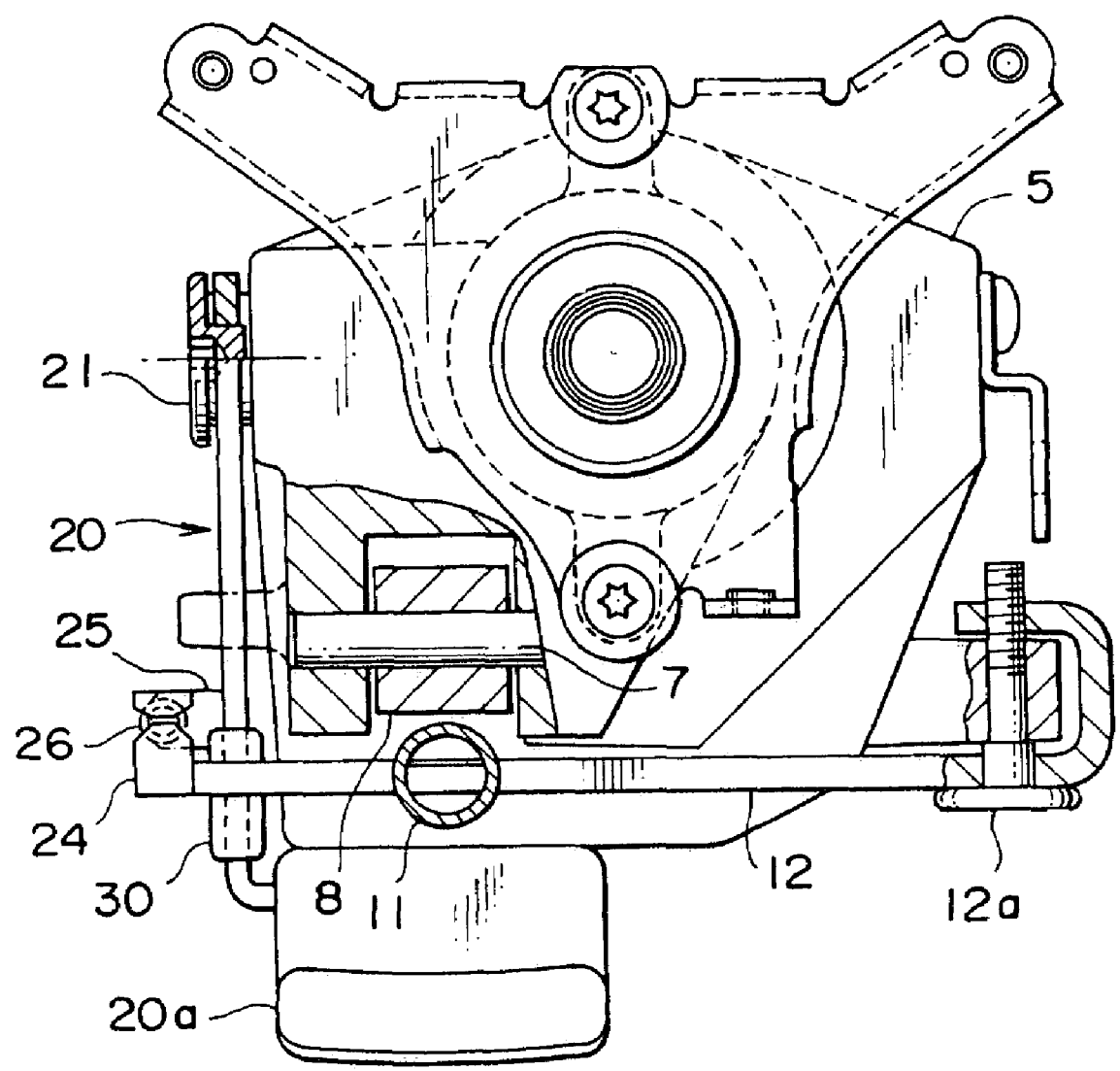
FIG. 6 is a rear view (showing the front as viewed from the rear of the vehicle) of the tilt adjusting type steering apparatus for the vehicle in a second embodiment of the present invention.
Figure 7:
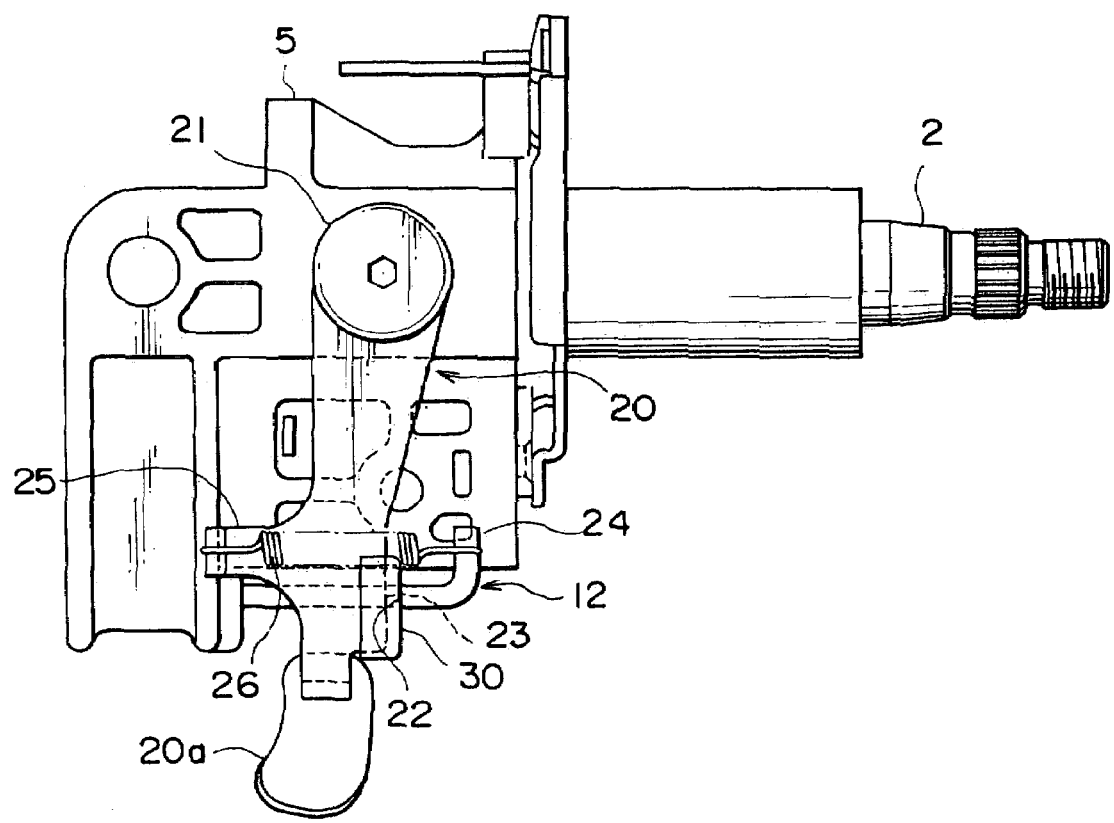
FIG. 7 is a side view showing the rear column member of the tilt adjusting type steering apparatus for the vehicle shown in FIG. 6.
Figure 8:
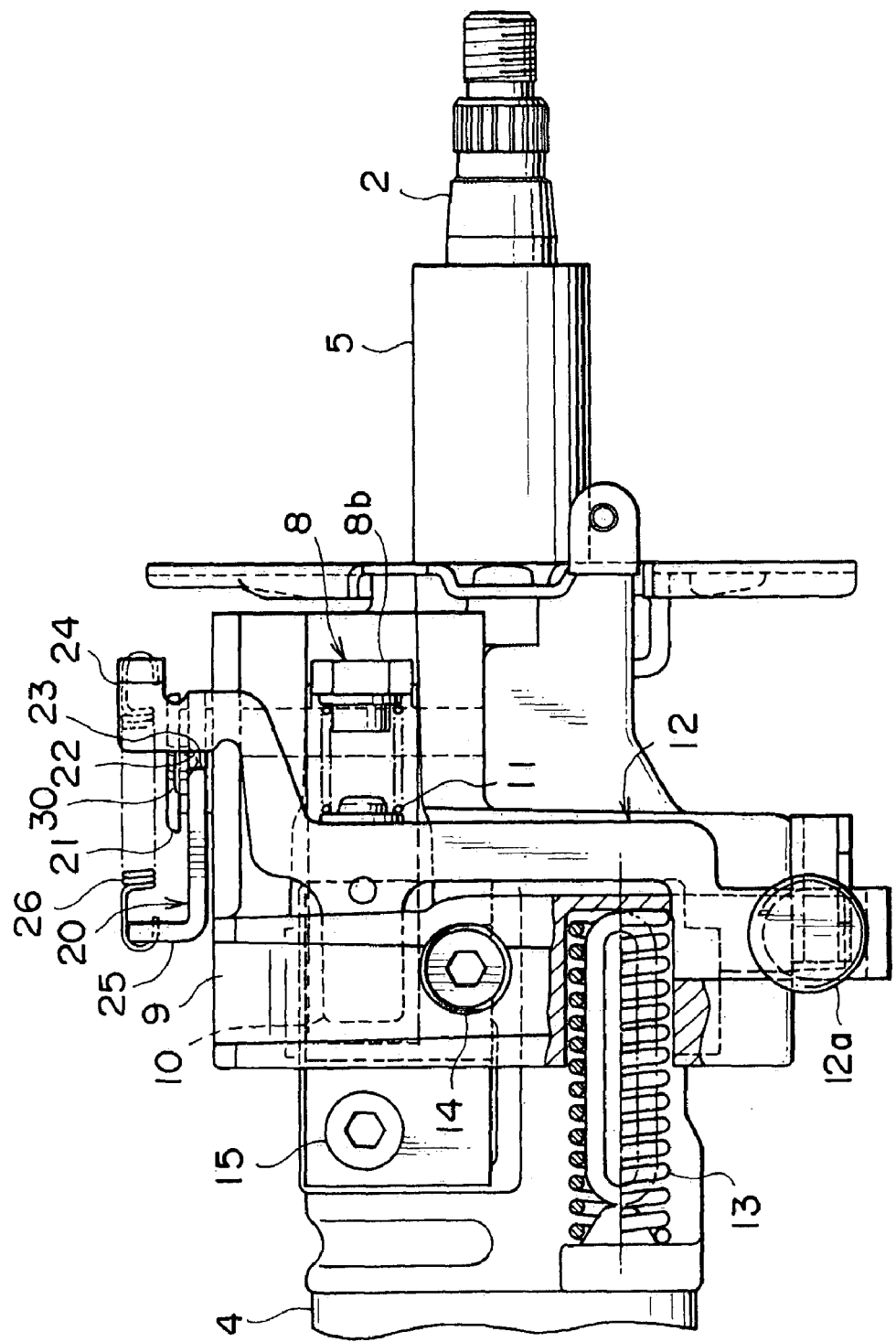
FIG. 8 is a bottom view of the tilt adjusting type steering apparatus for the vehicle shown in FIG. 6.

FIG. 6 is a rear view (showing the front as viewed from the rear of the vehicle) of the tilt type steering apparatus for the vehicle according to a second embodiment of the present invention. FIG. 7 is a side view showing the rear column member of the tilt adjusting type steering apparatus for the vehicle shown in FIG. 6. FIG. 8 is a bottom view of the tilt adjusting type steering apparatus for the vehicle shown in FIG. 6.

In the second embodiment, the slide surface 23 of the operator lever 20 is covered or coated with the buffer member 30 composed of a resin. To be specific, the resinous buffer member 30 is interposed between the slide surface 22 of the gear pressing lever 12 and the slide surface 23 of the operator lever 20.

With this configuration, when the two levers 12, 20 are swayed, the slide surface 22 of the gear pressing lever 12 can smoothly slide on the resinous buffer member 30, thereby making it possible to prevent a contact noise and a slide noise between the two levers 12, 20 and to improve the operation feeling of the operator lever 20.

Note that the buffer member may be applied or covered on the slide surface 22 of the gear pressing lever 12 as a reversal case to this example.

In this case also, when the handle portion 20a of the operator lever 20 is pulled back on the occasion of making the tilt adjustment, the operator lever 20 presses and sways the gear pressing lever 12 backwards of the vehicle while the buffer member 30 covered on the slide surface 23 slides on the slide surface 22 of the gear pressing lever 12. With this operation, the gear pressing lever 12 is swayed backwards of the vehicle, resisting the biasing force of the compression spring (the length-expansion coil spring) 11, thereby retreating the wedge-shaped member 10 back. As a result, the movable gear 8 is rotated with the assistance of the biasing force of the compression spring (the length-expansion coil spring) 11 and disengages from the fixed gear 6, whereby the tilt releasing can be attained.

After making the tilt adjustment, when the operator releases the hand from the handle portion 20a of the operator lever 20 or presses the handle portion 20a forwards of the vehicle, the gear pressing lever 12 is swayed forwards of the vehicle by the biasing force of the press spring (the length-expansion coil spring) 11, thereby moving the wedge-shaped member 10 forwards. As a result, the gear teeth portion 8a of the movable gear 8 is, by dint of the wedge-shaped member 10 biased by the compression spring (the length-expansion coil spring) 11, pressed against the gear teeth portion 6a of the fixed gear 6 and thus firmly meshes therewith, whereby the tilt fastening can be attained.

In the second embodiment also, the handle portion 20a of the operator lever 20 is disposed below the rear column member 5, and hence there is no portion protruded sideways of the handle portion of the tilt lever, thereby making it possible to prevent the tilt releasing upon the secondary collision. Further, the gear pressing lever 12 has the same structure as the conventional tilt lever has, and the conventional tilt lock mechanism can be used as it is.

(Third Embodiment)

Figure 9:
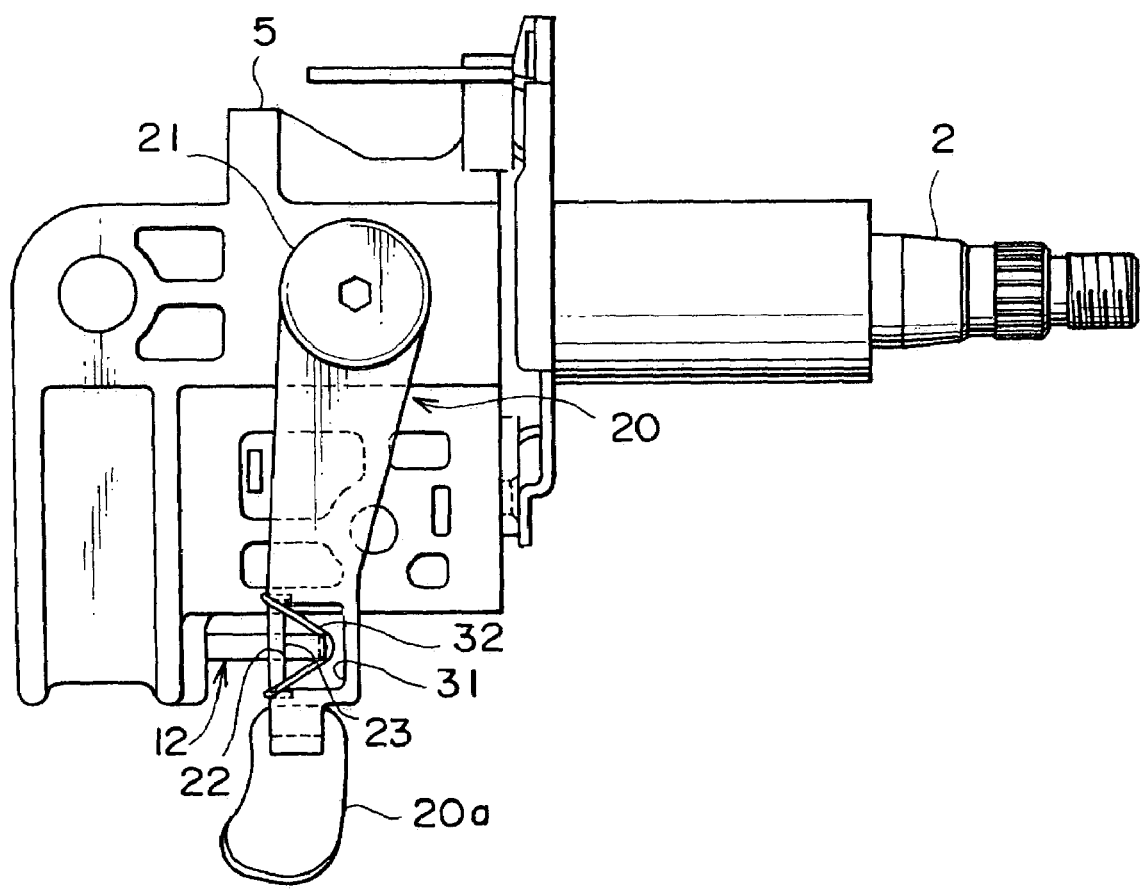
FIG. 9 is a side view of the tilt adjusting type steering apparatus for the vehicle in a third embodiment of the present invention.
Figure 10:
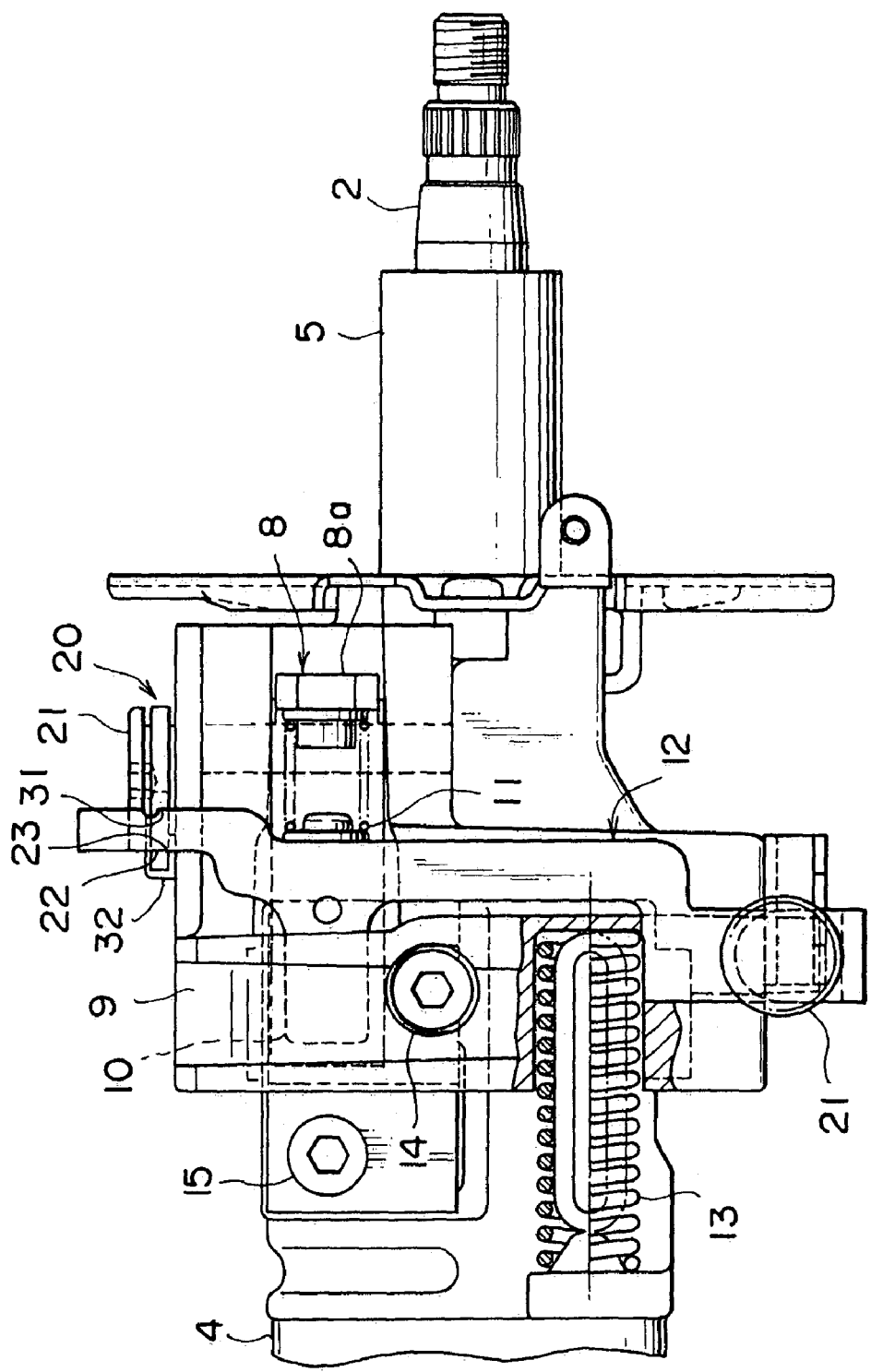
FIG. 10 is a bottom view of the tilt adjusting type steering apparatus for the vehicle shown in FIG. 9.

FIG. 9 is a side view of the tilt type steering apparatus in a third embodiment of the present invention. FIG. 10 is a bottom view of the tilt type steering apparatus illustrated in FIG. 9.

According to the third embodiment, the operator lever 20 is formed with a link hole 31, and the slide surface 22 of the gear pressing lever 12 abuts on the slide surface 23 of this link hole 31.

Further, a tension spring 32 for elastically biasing the two levers 12, 20 in such directions as to get close to each other, is provided between the gear pressing lever 12 and the operator lever 20. This tension spring 32 has the same function as the tension coil spring (the contraction coil spring) 26 in the embodiment discussed above has.

In this case also, when the handle portion 20*a* of the operator lever 20 is pulled back on the occasion of making the tilt adjustment, the operator lever 20 presses and sways the gear pressing lever 12 backwards of the vehicle while the slide surface 23 of the link hole 31 slides on the slide surface 22 of the gear pressing lever 12. With this operation, the gear pressing lever 12 is swayed backwards of the vehicle, against the biasing force of the compression coil spring (the length-expansion coil spring) 11, thereby retreating the wedge-shaped member 10 back. As a result, the movable gear 8 is rotated with the assistance of the biasing force of the compression spring (the length-expansion coil spring) 11 and disengages from the fixed gear 6, whereby the tilt releasing can be attained.

After making the tilt adjustment, when the operator releases the hand from the handle portion 20*a* of the operator lever 20 or presses the handle portion 20*a* forwards of the vehicle, the gear pressing lever 12 is swayed forwards of the vehicle by the biasing force of the compression spring (the length-expansion coil spring) 11, thereby moving the wedge-shaped member 10 forwards. As a result, the gear teeth portion 8*a* of the movable gear 8 is, by dint of the wedge-shaped member 10 biased by the compression spring (the length-expansion coil spring) 11, pressed against the gear teeth portion 6*a* of the fixed gear 6 and thus firmly meshes therewith, whereby the tilt fastening can be attained.

In the third embodiment also, the handle portion 20*a* of the operator lever 20 is disposed below the rear column member 5, and hence there is no portion protruded sideways of the handle portion of the tilt lever, thereby making it possible to prevent the tilt releasing upon the secondary collision. Further, the gear pressing lever 12 has the same structure as the conventional tilt lever has, and the conventional tilt lock mechanism can be used as it is.

(Fourth Embodiment)

Figure 11:
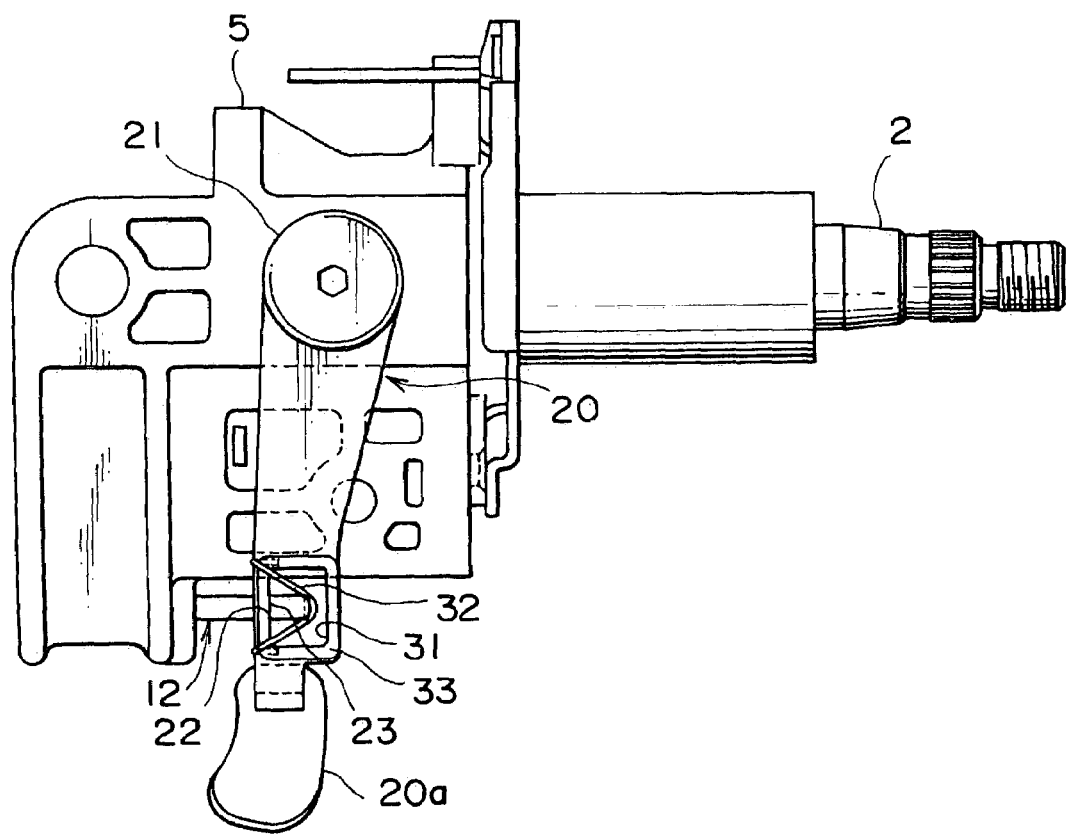
FIG. 11 is a side view of the tilt adjusting type steering apparatus for the vehicle in a fourth embodiment of the present invention.

FIG. 11 is a side view of the tilt adjusting type steering apparatus in a fourth embodiment of the present invention.

According to the fourth embodiment, the operator lever 20 is formed with the link hole 31. Further, the tension spring 32 for elastically biasing the two levers 12, 20 in such directions as to get close to each other, is provided between the gear pressing lever 12 and the operator lever 20. This tension spring 32 has the same function as the tension spring (the contraction coil spring) 26 in the embodiment discussed above has.

Moreover, the link hole 31 is provided with a ring-shaped buffer member 33 composed of a plastic resin. With this configuration, the slide surface 22 of the gear pressing lever 12 can smoothly slide on the resinous buffer member 33 when the two levers 12, 20 are swayed, thereby preventing a contact noise and a slide noise between the two levers 12, 20 and also to improve the operation feeling of the operator lever 20. Note that the buffer member may be provided on the slide surface 22 of the gear pressing lever 12 as a reversal case to this example.

In this case also, when the handle portion 20*a* of the operator lever 20 is pulled back on the occasion of making the tilt adjustment, the operator lever 20 presses and sways the gear pressing lever 12 backwards of the vehicle while the buffer member 33 of the link hole 31 slides on the slide surface 22 of the gear pressing lever 12. With this operation, the gear pressing lever 12 is swayed backwards of the vehicle, against the biasing force of the compression spring (the length-expansion coil spring) 11, thereby retreating the wedge-shaped member 10 back. As a result, the movable gear 8 is rotated with the assistance of the biasing force of the compression spring (the length-expansion coil spring) 11 and disengages from the fixed gear 6, whereby the tilt releasing can be attained.

After making the tilt adjustment, when the operator releases the hand from the handle portion 20*a* of the operator lever 20 or presses the handle portion 20*a* forwards of the vehicle, the gear pressing lever 12 is swayed forwards of the vehicle by the biasing force of the compression spring (the length-expansion coil spring) 11, thereby moving the wedge-shaped member 10 forwards. As a result, the gear teeth portion 8*a* of the movable gear 8 is, by dint of the wedge-shaped member 10 biased by the compression spring (the length-expansion coil spring) 11, pressed against the gear teeth portion 6*a* of the fixed gear 6 and thus firmly meshes therewith, whereby the tilt fastening can be attained.

In the fourth embodiment also, the handle portion 20*a* of the operator lever 20 is disposed below the rear column member 5, and hence there is no portion protruded sideways of the handle portion of the tilt lever, thereby making it possible to prevent the tilt releasing upon the secondary collision. Further, the gear pressing lever 12 has the same structure as the conventional tilt lever has, and the conventional tilt lock mechanism can be used as it is.

Note that the present invention can be modified in a variety of forms without being limited to the embodiments discussed above. For example, the movable gear may be provided on the front column member, and the fixed gear may be provided on the rear column member.

As discussed above, according to the present invention, the operator lever for swaying the gear pressing lever is provided, thereby facilitating an adoption of the configuration for preventing the tilt releasing upon the secondary collision.

Further, the gear pressing lever has the same structure as the conventional tilt lever has, and the conventional tilt lock mechanism can be used as it is.

What is claimed is:

1. A tilt adjusting type steering apparatus for a vehicle, comprising:
    a front column member fixed to a vehicle body;
    a rear column member tiltably connected to said front column member;
    a fixed gear provided on one of said front column member and said rear column member;
    a movable gear provided on the other of said front column member and said rear column member;
    a gear pressing lever swayed to effect fastening of said rear column member at a tilt adjusted position by making said movable gear mesh with said fixed gear or to effect releasing of said rear column member from the tilt adjusted position by disengagement of said movable gear and said fixed gear from each other; and an operator lever for interlocking with and swaying said gear pressing lever while being swayed by an operation of an operator, wherein a center of swaying movement of said gear pressing lever and a center of swaying movement of said operator lever are different from each other, said operator lever having a portion which presses a portion of said gear pressing lever and shifts relative to said portion of said gear pressing lever during an operation of said operation lever.

2. A tilt adjusting type steering apparatus for a vehicle according to claim 1, wherein a handle portion, for the operator, of said operator lever is disposed under said rear column member.

3. A tilt adjusting type steering apparatus for a vehicle according to claim 2, wherein said operator lever is molded of a non-ferrous metal or a synthetic resin.

4. A tilt adjusting type steering apparatus for a vehicle according to claim 2, further comprising a biasing device elastically biasing at least one of said gear pressing lever and said operator lever toward the other.

5. A tilt adjusting type steering apparatus for a vehicle according to claim 1, wherein buffer member is interposed between said portions of said gear pressing lever and said operator lever.

6. A tilt adjusting type steering apparatus for a vehicle according to claim 5, further comprising a biasing device elastically biasing at least one of said gear pressing lever and said operator lever toward the other.

7. A tilt adjusting type steering apparatus for a vehicle according to claim 5, wherein a handle portion of said operator lever is disposed farther away from the center of the sway of said operator lever than said portion of said operator lever which presses said portion of said gear pressing lever.

8. A tilt adjusting type steering apparatus for a vehicle according to claim 7, wherein a proximal end portion of said gear pressing lever is supported in a swayable manner on a lower side of said rear column member, a proximal end portion of said operator lever is supported in a swayable manner on a lateral side of said rear column member, a middle portion thereof is abutted with said gear pressing lever through said buffer member, and a distal end portion thereof is bent as a handle portion and extended toward an area under a lower part of said rear column member, and said operator lever, when swayed in back-and-forth directions of the vehicle, interlocks with and sways said gear pressing lever in the back-and-forth directions of the vehicle.

9. A tilt adjusting type steering apparatus for a vehicle according to claim 7, further comprising a biasing device elastically biasing at least one of said gear pressing lever and said operator lever toward the other.

10. A tilt adjusting type steering apparatus for a vehicle according to claim 5, wherein a proximal end portion of said gear pressing lever is supported in a swayable manner on a lower side of said rear column member, a proximal end portion of said operator lever is supported in a swayable manner on a lateral side of said rear column member, a middle portion thereof is abutted with said gear pressing lever through said buffer member, and a distal end portion thereof is bent as a handle portion and extended under a lower part of said rear column member, and said operator lever, when swayed in back-and-forth directions of the vehicle, interlocks with and sways said gear pressing lever in the back-and-forth directions of the vehicle.

11. A tilt adjusting type steering apparatus for a vehicle according to claim 10, further comprising a biasing device elastically biasing at least one of said gear pressing lever and said operator lever toward the other.

12. A tilt adjusting type steering apparatus for a vehicle according to claim 5, wherein said operator lever is molded of a non-ferrous metal or a synthetic resin.

13. A tilt adjusting type steering apparatus for a vehicle according to claim 12, further comprising a biasing device elastically biasing at least one of said gear pressing lever and said operator lever toward the other.

14. A tilt adjusting type steering apparatus for a vehicle according to claim 1, wherein a handle portion of said operator lever is disposed farther away from the center of the sway of said operator lever than said portion of said operator lever which presses said portion of said gear pressing lever.

15. A tilt adjusting type steering apparatus for a vehicle according to claim 14, further comprising a biasing device elastically biasing at least one of said gear pressing lever and said operator lever toward the other.

16. A tilt adjusting type steering apparatus for a vehicle according to claim 14, wherein said operator lever is molded of a non-ferrous metal or a synthetic resin.

17. A tilt adjusting type steering apparatus for a vehicle according to claim 16, further comprising a biasing device elastically biasing at least one of said gear pressing lever and said operator lever toward the other.

18. A tilt adjusting type steering apparatus for a vehicle according to claim 14, wherein a proximal end portion of said gear pressing lever is supported in a swayable manner on a lower side of said rear column member, a proximal side end portion of said operator lever is supported in a swayable manner on a lateral side of said rear column member, a middle portion thereof is abutted with said gear pressing lever directly or through a buffer member interposed therebetween, and a distal end portion thereof is bent as a handle portion and extended toward an area under a lower part of said rear column member, and said operator lever, when swayed in back-and-forth directions of the vehicle, interlocks with and sways said gear pressing lever in the back-and-forth directions of the vehicle.

19. A tilt adjusting type steering apparatus for a vehicle according to claim 18, further comprising a biasing device elastically biasing at least one of said gear pressing lever and said operator lever toward the other.

20. A tilt adjusting type steering apparatus for a vehicle according to claim 1, wherein said operator lever is molded of a non-ferrous metal or a synthetic resin.

21. A tilt adjusting type steering apparatus for a vehicle according to claim 20, further comprising a biasing device elastically biasing at least one of said gear pressing lever and said operator lever toward the other.

22. A tilt adjusting type steering apparatus for a vehicle according to claim 1, wherein a proximal end portion of said gear pressing lever is supported in a swayable manner on a lower side of said rear column member, a proximal end portion of said operator lever is supported in a swayable manner on a lateral side of said rear column member, a middle portion thereof is abutted with said gear pressing lever directly or through a buffer member interposed therebetween, and a distal end portion thereof is bent as a handle portion and extended toward an area under said rear column member, and said operator lever, when swayed in back-and-forth directions of the vehicle, interlocks with and sways said gear pressing lever in the back-and-forth directions of the vehicle.

23. A tilt adjusting type steering apparatus for a vehicle according to claim 22, further comprising a biasing device elastically biasing at least one of said gear pressing lever and said operator lever toward the other.

24. A tilt adjusting type steering apparatus for a vehicle according to claim 22, wherein said operator lever is molded of a non-ferrous metal or a synthetic resin.

25. A tilt adjusting type steering apparatus for a vehicle according to claim 1, further comprising a biasing device elastically biasing at least one of said gear pressing lever and said operator lever toward the other.

26. A tilt adjusting type steering apparatus for a vehicle according to claim 1, wherein said portion of said gear pressing lever and said portion of said operator lever are abutted with each other directly or through a buffer member interposed therebetween.

27. A tilt adjusting type steering apparatus for a vehicle, comprising:
a front steering column member;
a rear steering column member tiltably connected to said front steering column member;
a fixed gear provided on one of said front steering column member and said rear steering column member;
a movable gear provided on the other of said front steering column member and said rear steering column member, said movable gear being engageable with said fixed gear to fix a tilt position of said rear steering column member and being disengageable from said fixed gear to release said rear steering column member for tilt adjustment;
a gear pressing lever which pivots about a first pivot axis to engage and disengage said movable gear and said fixed gear; and
an operator lever which pivots about a second pivot axis different from said first pivot axis, to pivot said gear pressing lever for engagement and disengagement of said movable gear and said fixed gear, said operator lever acting on said gear pressing lever through a portion which moves relative to said gear pressing lever during operation of said operator lever.

28. A tilt adjusting type steering apparatus for a vehicle according to claim 27, wherein first pivot axis is transverse to said second pivot axis.

29. A tilt adjusting type steering apparatus for a vehicle according to claim 28, wherein a handle portion, for the operator, of said operator lever is disposed under said rear steering column member.

30. A tilt adjusting type steering apparatus for a vehicle according to claim 28, wherein
said gear pressing lever has a proximal end portion pivotally supported on a lower side of said rear steering column member, and
said operator lever has a proximal end portion pivotally supported on a lateral side of said rear steering column member, a middle portion abutted with a portion of said gear pressing lever directly or through a buffer member interposed therebetween, and a distal end portion bent as a handle portion and extended toward an area under a lower part of said rear steering column member.

31. A tilt adjusting type steering apparatus for a vehicle according to claim 28, wherein a portion of said operator lever and a portion of said gear pressing lever are abutted with each other directly or through a buffer member interposed therebetween.

32. A tilt adjusting type steering apparatus for a vehicle according to claim 31, further comprising a biasing device which biases at least one of said portions of said operator lever and said gear pressing lever toward the other, so that said operator lever and said gear pressing lever are interlocked during pivotal movement of said operating lever to engage and disengage said fixed gear and said movable gear.

33. A tilt adjusting type steering apparatus for a vehicle according to claim 27, wherein a portion of said operator lever and a portion of said gear pressing lever are abutted with each other directly or through a buffer member interposed therebetween.

34. A tilt adjusting type steering apparatus for a vehicle according to claim 33, further comprising a biasing device which biases at least one of said portions of said operator lever and said gear pressing lever toward the other, so that said operator lever and said gear pressing lever are interlocked during pivotal movement of said operating lever to engage and disengage said fixed gear and said movable gear.

35. A tilt adjusting type steering apparatus for a vehicle according to claim 33, wherein a handle portion, for the operator, of said operator lever is disposed under said rear steering column member.

36. A tilt adjusting type steering apparatus for a vehicle, comprising:
a front steering column member;
a rear steering column member tiltably connected to said front steering column member;
a fixed gear provided on one of said front steering column member and said rear steering column member;
a movable gear provided on the other of said front steering column member and said rear steering column member, said movable gear being engageable with said fixed gear to fix a tilt position of said rear steering column member and being disengageable from said fixed gear to release said rear steering column member for tilt adjustment;
a gear pressing lever which pivots about a pivot axis disposed in a plane substantially perpendicular to tilt adjustment axis of said rear steering column member, to engage and disengage said movable gear and said fixed gear; and
an operator lever which is operable by an operator to pivot said gear pressing lever for engagement and disengagement of said movable gear and said fixed gear, said operator lever acting on said gear pressing lever through a portion which moves relative to said gear pressing lever during operation of said operator lever.

37. A tilt adjusting type steering apparatus for a vehicle according to claim 36, wherein a portion of said operator lever and a portion of said gear pressing lever are abutted with each other directly or through a buffer member interposed therebetween.

38. A tilt adjusting type steering apparatus for a vehicle according to claim 37, further comprising a biasing device which biases at least one of said portions of said operator lever and said gear pressing lever toward the other, so that said operator lever and said gear pressing lever are interlocked during pivotal movement of said operating lever to engage and disengage said fixed gear and said movable gear.

39. A tilt adjusting type steering apparatus for a vehicle according to claim 37, wherein a handle portion, for the operator, of said operator lever is disposed under said rear steering column member.

* * * * *